3,564,025
Patented Feb. 16, 1971

3,564,025
2 - METHOXY - 6 - MULTIPRENYL - 1,4 - BENZOQUINONES AND A PROCESS OF MAKING
Karl Folkers and Glenn Doyle Daves, Jr., Menlo Park, Calif., assignors to Merck & Co., Inc., Rahway, N.J., a corporation of New Jersey
No Drawing. Filed June 28, 1966, Ser. No. 561,024
Int. Cl. C07c 49/64
U.S. Cl. 260—396                              7 Claims

ABSTRACT OF THE DISCLOSURE 2-methoxy-6-multiprenyl-1,4-benzoquinones are prepared by reacting a 2-methoxy-6-multiprenylphenol with potassium nitrodisulfonate. The products are useful as intermediates in the microbiological synthesis of coenzyme Q compounds.

---

This invention relates to methoxy derivatives of multiprenyl-1,4-benzoquinones. More particularly, it is concerned with 2-methoxy-6-multiprenyl-1,4-benzoquinones and processes for their synthesis from 2-methoxy-6-multiprenylphenols.

The 2-methoxy-6-multiprenyl-1,4-benzoquinones obtained in accordance with this invention are useful as intermediates in the microbiological biosynthesis of corresponding coenzyme Q's, compounds possessing important biological and therapeutic properties. The new compounds of this invention are prepared by reacting a phenol bearing a methoxyl and polyisoprenyl grouping in positions meta to each other and ortho to the phenolic group with potassium nitrosodisulfonate to produce the corresponding 1,4-benzoquinone. This reaction can be shown as follows:

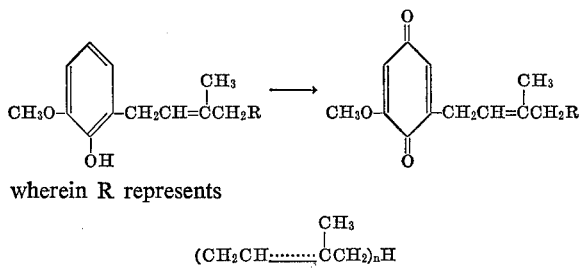

wherein R represents $$(CH_2CH\text{-----}\overset{CH_3}{\underset{}{C}}CH_2)_nH$$

where the double bond shown by the dotted line can also be completely saturated by hydrogen and $n$ is an integer from 0 to 9 inclusive.

The reaction is carried out by contacting the phenol compound with potassium nitrosodisulfonate and then recovering the quinone compound from the resulting reaction mixture. It is most conveniently carried out by adding a solution consisting of two parts of potassium nitrosodisulfonate in aqueous buffer solution to a solution of one part of the phenol compound in an organic solvent which is miscible with water (for example, acetone or dioxane) and vigorously mixing the resulting solution. The quinone compound is recovered from the reaction mixture by extracting the reaction mixture with an organic solvent, such as ether or chloroform, capable of forming a two-phase system. The quinone compound can be obtained by concentrating the separated organic solution. The product so obtained can be further purified by chromatography over adsorbents such as silica gel or a magnesium silicate. The quinone compound is recovered from the adsorbent by elution with a suitable solvent such as 10% ether in hexane.

The following examples illustrate specific methods of carrying out the various processes of the present invention:

EXAMPLE 1

2-methoxy-6-phytyl-1,4-benzoquinone

To a vigorously stirred solution of 0.315 g. of 2-methoxy-6-phytylphenol dissolved in 20 ml. of acetone and 15 ml. of dioxane is added a solution of 0.400 g. of potassium nitrosodisulfonate in 150 ml. of 0.03 N potassium phosphate, monobasic. After two hours the reaction mixture is extracted with 3 × 50 ml. of ether. The combined organic extract is dried over sodium sulfate and the solvent evaporated to yield an oily residue. This material is subjected to preparative thin layer chromatography on silica gel G plates developed in 10% ether in hexane to yield the product, 2-methoxy-6-phytyl-1,4-benzoquinone as a yellow oil characterized by —

UV: $\lambda_{max.}^{hexane}$, 260 m$\mu$

NMR (CCl$_4$): 1H, $\tau$ 3.7 (m.), ring C–5 proton; 1H, $\tau$ 4.28 (s.), ring C–3 proton; 1H, $\tau$ 4.95 (t.), vinyl; 3H, $\tau$ 6.27 (s.), methoxyl; 2H, $\tau$ 6.96 (d.), benzylic; 8.0–9.2 (m.), alkyl.

EXAMPLE 2

2-methoxy-6-solanesyl-1,4-benzoquinone

To a stirred solution of 0.2 g. of 2-methoxy-6-solanesylphenol in 15 ml. of acetone and 10 ml. of dioxane is added a solution of 0.15 g. of potassium nitrosodisulfonate in 75 ml. of 0.03 N potassium phosphate, monobasic. After a reaction period, the reaction mixture is extracted with ether. The combined organic extract is dried over sodium sulfate and evaporated to leave an oily residue. This residue is subjected to chromatography on silica gel to yield 2-methoxy-6-solanesyl-1,4-benzoquinone.

EXAMPLE 3

2-methoxy-6-geranyl-1,4-benzoquinone

To a solution of 2-methoxy-6-geranylphenol in a mixture of acetone and dioxane, an aqueous solution of potassium nitrosodisulfonate and monobasic potassium phosphate is added. After the reaction period, the mixture is extracted with ether. The organic extract is dried over sodium sulfate and the solvent is removed to leave the crude reaction product. This reaction mixture is subjected to chromatography on silica gel to yield 2-methoxy-6-geranyl-1,4-benzoquinone. This product has an ultraviolet absorption maximum at approximately 260 m$\mu$.

EXAMPLE 4

2-methoxy-6-decaprenyl-1,4-benzoquinone

To an acetone solution of 2-methoxy-6-decaprenylphenol is added a dilute aqueous solution of potassium nitrosodisulfonate and monobasic potassium phosphate. After a reaction period of several hours, the mixture is extracted with ether. The dried organic extract is evaporated and the resulting residue is chromatographed on silica gel. The 2-methoxy-6-decaprenyl-1,4-benzoquinone obtained in this manner exhibits characteristic spectral properties consistent with the assigned structure.

EXAMPLE 5

2-methoxy-6-farnesyl-1,4-benzoquinone

To a stirred solution of 2-methoxy-6-farnesylphenol in dioxane is added in one portion an aqueous solution of potassium nitrosodisulfonate and monobasic potassium phosphate. After an interval of several hours, the reaction mixture is extracted with ether. The organic extract is dried, and the resulting residue upon chromatography yields 2-methoxy-6-farnesyl-1,4-benzoquinone. This product exhibits an ultraviolet absorption maximum near 260 mμ.

The 2-methoxy-6-multiprenylphenols used as starting materials in the foregoing examples can be prepared in accordance with processes disclosed in our copending application Ser. No. 561,070 filed on even date herewith, now abandoned.

What is claimed is:

1. A compound of the formula

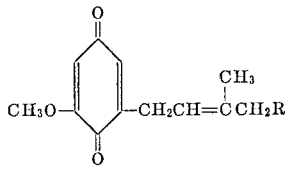

wherein R represents

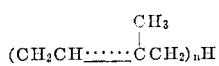

where the double bond shown by the dotted line may be saturated with hydrogen and $n$ is an integer from 0 to 9 inclusive.

2. A compound according to claim 1 which is 2-methoxy-6-phytyl-1,4-benzoquinone.
3. A compound according to claim 1 which is 2-methoxy-6-solanesyl-1,4-benzoquinone.
4. A compound according to claim 1 which is 2-methoxy-6-geranyl-1,4-benzoquinone.
5. A compound according to claim 1 which is 2-methoxy-6-decaprenyl-1,4-benzoquinone.
6. A compound according to claim 1 which is 2-methoxy-6-farnesyl-1,4-benzoquinone.

7. The process which comprises reacting a compound of the formula

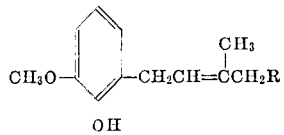

wherein R represents

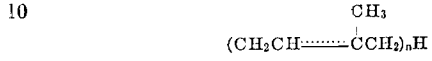

where the unsaturated bond shown by the dotted line can be completely saturated by hydrogen and $n$ represents an integer from 0 to 9 inclusive, with potassium nitrosodisulfonate to produce a compound of the formula

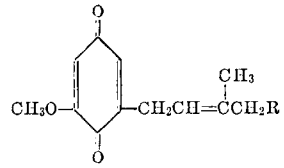

where R is the same as above.

References Cited
UNITED STATES PATENTS

| | | | |
|---|---|---|---|
| 3,118,914 | 1/1964 | Glour et al. | 260—396 |
| 3,154,565 | 10/1964 | Linn et al. | 260—345.2 |

LORRAINE A. WEINBERGER, Primary Examiner

L. A. THAXTON, Assistant Examiner

U.S. Cl. X.R.

260—613